United States Patent [19]

Stanley

[11] Patent Number: 4,980,949
[45] Date of Patent: Jan. 1, 1991

[54] APPARATUS AND METHODS FOR FILLING SLACK FILLED FOOD CASINGS

[75] Inventor: Thomas R. Stanley, Kansas City, Mo.

[73] Assignee: Teepak, Inc., Westchester, Ill.

[21] Appl. No.: 452,882

[22] Filed: Dec. 19, 1989

[51] Int. Cl.⁵ ............................................. A22C 21/00
[52] U.S. Cl. ......................................... 452/37; 452/32
[58] Field of Search ................... 17/49, 35, 1 F, 33, 17/34

[56] References Cited

U.S. PATENT DOCUMENTS

| | | | |
|---|---|---|---|
| 4,434,528 | 3/1984 | Niedecker | 17/49 |
| 4,437,209 | 3/1984 | Duroyon | 17/49 |
| 4,438,545 | 3/1984 | Kupcikevicius et al. | 17/49 |
| 4,709,450 | 12/1987 | Stanley et al. | 17/49 |
| 4,750,239 | 6/1988 | Niedecker | 17/34 |
| 4,773,127 | 9/1988 | Stall | 17/49 |
| 4,773,128 | 9/1988 | Stanley et al. | 17/49 |

*Primary Examiner*—Willis Little
*Attorney, Agent, or Firm*—Howard M. Ellis; Michael L. Dunn

[57] ABSTRACT

Improved method and apparatus for preparing partially/slack filled food casings enables food processors to make loaf style meat and sausage products with substantially "D" shaped cross sectional configurations with lower risk for casing rupture. By means of a casing slacker apparatus having a shutter/gate assembly mounted on an axially translatable carriage a predetermined length of additional unfilled casing is withdrawn from the filling horn after the filling cycle is completed. After completing the clip, cut and dump cycles the foodstuff is distriuted evenly throughout the casing and molded or shaped as desired.

19 Claims, 5 Drawing Sheets

APPARATUS AND METHODS FOR FILLING SLACK FILLED FOOD CASINGS

BACKGROUND OF THE INVENTION

This invention relates generally to apparatus and methods for packaging food products, and more specifically, to improved equipment and methods for filling cylindrically shaped food casings for loaf style meat and sausage products.

In the manufacture of meat and sausage products, it is customary to prepare, for example, a meat emulsion from comminuted meat together with fillers, seasonings, spices, etc. A tubular food casing, such as nonedible cellulose, is loaded onto the stuffing horn of a filling machine and stuffed with the meat emulsion. For sausage products like bologna, salami, and the like, the meat emulsion is introduced into large, heavy walled fibrous type casings and formed into round shaped chubs or lengthy individual sausage sticks.

In contrast to rounded/circular shaped sausage products, U.S. Pat. No. 4,434,528 to Niedecker discloses square shaped products, such as hamloaf, turkeyloaf, etc., where the final product has essentially a rectangular or "D" shaped cross-sectional configuration resembling a slice of bread. Niedecker's methods begin with preparation of slack filled casing containing the desired final quantity of meat which is less than the casings volumetric capacity. The partially filled, rounded sausage is placed in a metal mold and compressed into a rectangularly shaped product.

More specifically, in preparing partially filled products according to Niedecker's method, a first length of casing is filled to capacity with the desired final volume of meat. A device for gathering casing and applying a closing clip is actuated. But, before being fully closed the first length of filled casing is compressed between a pair of mechanical jaws. The pressure applied is sufficient to compress the filled portion and simultaneously withdraw the product from the horn downstream in the filling direction causing residual unfilled casing on the filling horn to be drawn through the partially closed clip.

In the process, sausage meat is displaced upstream into the unfilled casing as the casing is drawn through to provide a slack filled product.

Thus, the methods of U.S. Pat. No. 4,434,528 are dependent on the direct application of substantial force through direct compression of a filled casing. In the process of displacing meat emulsion upstream unfilled casing withdrawn from the stuffing horn must be threaded through a partially closed chub clip. Unless the unfilled casing readily threads through the clip with pressure applied by the mechanical jaws there is an increased statistical risk of casing rupture occurring. This means potentially costly down time for cleanup, lost meat emulsion in the work area, lost production and wasted casings. Accordingly, it would be desirable to have a more reliable method and apparatus for preparing partially filled food casings which offer a lower risk profile for casing rupture.

SUMMARY OF THE INVENTION

It is a principal object of the invention to provide a method for partially filling food casing with a reduced risk of casing rupture by the steps of:

a) loading a stuffing horn at a filling station with a food casing having a first and a second end wherein the first end has an end-closure;

b) withdrawing a first portion of a required final length of casing from the stuffing horn by filling a first interior region with a foodstuff, e.g. meat emulsion;

c) withdrawing a second portion of the required final length of casing from the stuffing horn to provide a second interior region substantially free of foodstuff, the second interior region being a continuation of the first interior region;

d) closing the second end of the casing, and e) distributing the contents of the first interior region of the casing to the second interior region to provide a slack filled product.

Because additional casing is not withdrawn from the filling horn by compressing the filled portion and additional withdrawn casing is not threaded through an end-closure clip there is statistically a lower risk of casing rupture occurring.

As a further embodiment of the invention the above method may include the step of engaging an end of the filled first region, and axially pulling the second portion of casing from the filling horn which is substantially free of foodstuff. This may be performed by transversally engaging the trailing end of the first region adjacent to the outlet end of the stuffing horn. The slack filled casing can then be molded into a substantially rectangular shaped food product, e.g. turkeyloaf or other generally "D" shaped cross sectional foodstuff.

As a further object the present invention includes an apparatus for partially filling a food casing, which comprises pump means for pressurizing a foodstuff, a stuffing horn with an inlet for receiving the pressurized foodstuff, and an outlet downstream from the inlet for delivering the foodstuff to a casing mounted on the stuffing horn, means for closing terminal ends of the casing, and means for clamping-off the casing between said terminal ends to maintain substantially all the foodstuff in a first interior region of a required final length of the casing and for axially pulling additional casing from the stuffing horn to provide a second interior region within the required final length of casing which is substantially free of foodstuff and for releasing said casing to provide a continuous, undivided casing interior having foodstuff concentrated substantially in one section thereof.

As a further embodiment the invention contemplates means for molding the above partially or slack filled casing into a generally rectangular shaped product, e.g. loaf configuration.

It is yet a further object of the present invention to provide for an apparatus for clamping-off the casing which comprises co-acting shutters for transversally engaging the casing, and motor means for axially moving the shutters relative to the stuffing horn. This embodiment may also include carriage means for axially conveying means for closing the terminal ends of the casing and the apparatus for clamping-off between terminal ends of the casing. Such apparatus is preferably used in combination with sizing means for regulating the diameter of casing during the filling cycle.

DESCRIPTION OF THE DRAWINGS

For a further understanding of the invention as well as its characterizing features, reference should now be made to the following detailed description thereof taken in conjunction with the accompanying drawings, wherein.

DETAILED DESCRIPTION OF THE INVENTION

Figure 1:
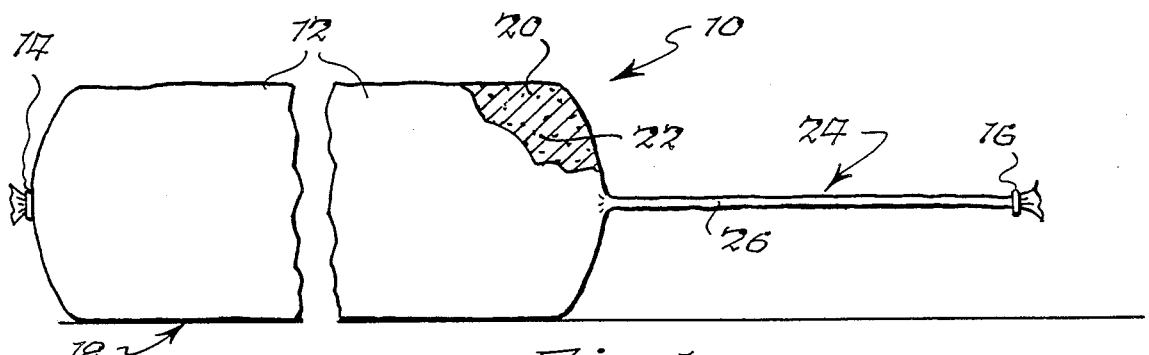
FIG. 1 is a side elevational view of a partially filled food casing with a portion of the outer casing broken away.

Turning first to FIG. 1 there is shown an encased partially filled food product 10 comprising a meat emulsion in which the package has a conventional circular cross-sectional configuration (not shown). The outer food casing 12 is usually a nonedible food grade film either fibrous reinforced or nonreinforced type. For larger diameter products, as contemplated herein, heavier walled food casings typically of cellulose are preferred, although other well known food grade films are also suitable. Each end of the partially filled product 10 has a closure. The leading end or first portion 18 of casing 12 is shown with a metal clip 14 and the trailing end or second portion 24 with a metal or equivalent chub clip 16.

First portion 18 of casing 12 holds virtually all the meat emulsion 20 in first interior region 22 which is tightly filled usually to capacity, whereas second portion 24 of the closed casing forming the second interior region 26 is virtually free of emulsion and air, as demonstrated by its generally collapsed appearance.

Figure 2:
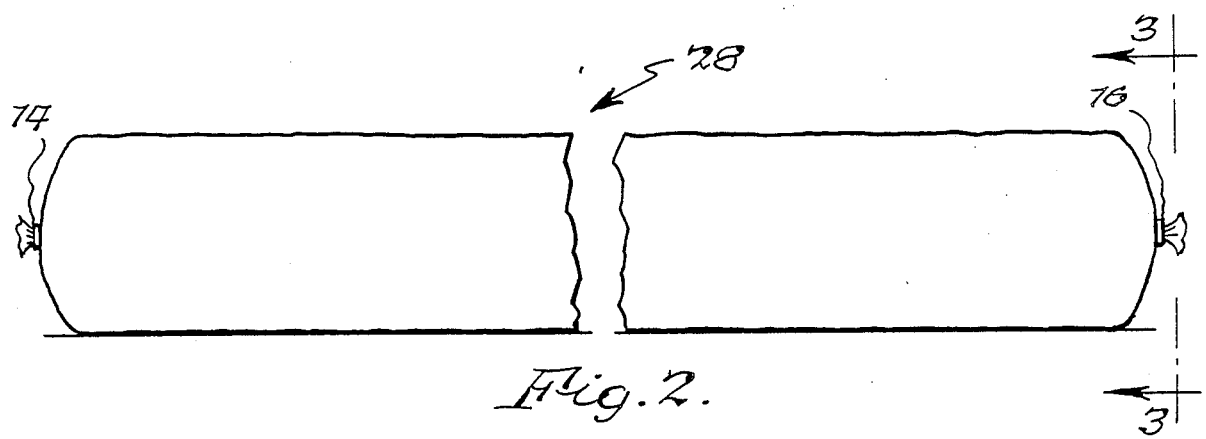
FIG. 2 is a side elevational view of the partially filled or slack filled food casing of FIG. 1 after the foodstuff has been distributed in the closed casing.

FIG. 2 depicts a generally expanded, but loosely filled casing 28, compared to the partially filled casing of FIG. 1, after the emulsion 20 originally concentrated in first interior region 22 is distributed between the first and second regions. Because the first interior region is substantially fully expanded with foodstuff as shown by FIG. 1, subsequent distribution of the same quantity of emulsion between the first and second regions provides for a longitudinally expanded food casing which is loose or slack filled.

Figure 3:
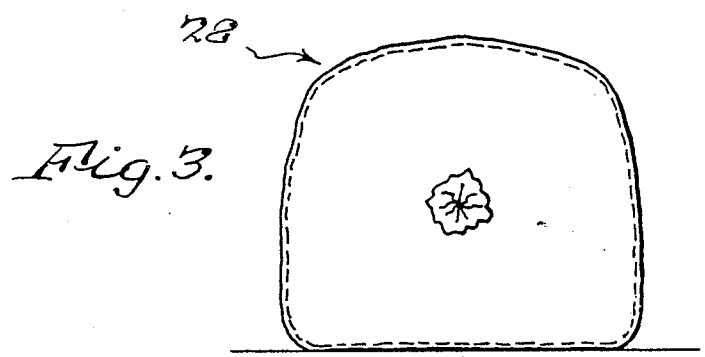
FIG. 3 is an end view of the filled food casing taken along line 3—3 of FIG. 2.
Figure 4:
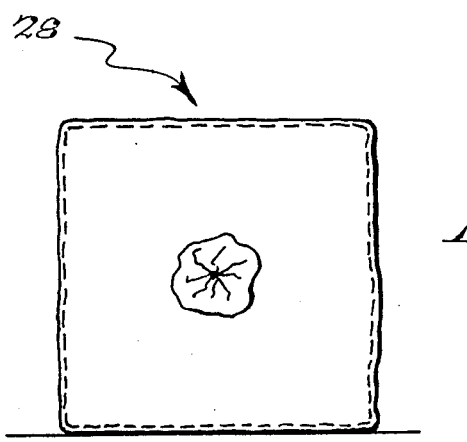
FIG. 4 is an end view of a further loaf style food product having a generally rectangular cross-sectional configuration.

Because the second interior region is an unobstructed continuation of the first interior region distribution of the foodstuff in the casing can be performed, for instance, manually or with the aid of molds by machine operators, who smooth out the foodstuff in the casing. The slack filled product may, for example, be transformed from one having a more conventional circular shape into a loaf-shaped product so when cut into individual slices each slice will have a generally "D" shaped configuration (FIG. 3), a rectangular shape (FIG. 4), and so on.

For purposes of the present invention the apparatus and methods of making slack filled encased products like those of FIGS. 1–4 will be illustrated with reference to the food stuffing apparatus like that disclosed in U.S. Pat. Nos. 4,709,450 and 4,773,128 both to Thomas R. Stanley, et al, the contents of which are incorporated-by-reference herein. While the apparatus and methods described in the above patents are intended for preparing dimensionally uniform filled products, it is to be understood that the methods and apparatus for preparing encased, slack filled products as disclosed herein are not restricted or intended to be limited only for use in conjunction with such sizing methods or equipment, but may be utilized with a broad range of filling machines and methods. This will be readily apparent to persons of ordinary skill having had the benefit of this disclosure.

Figure 5:
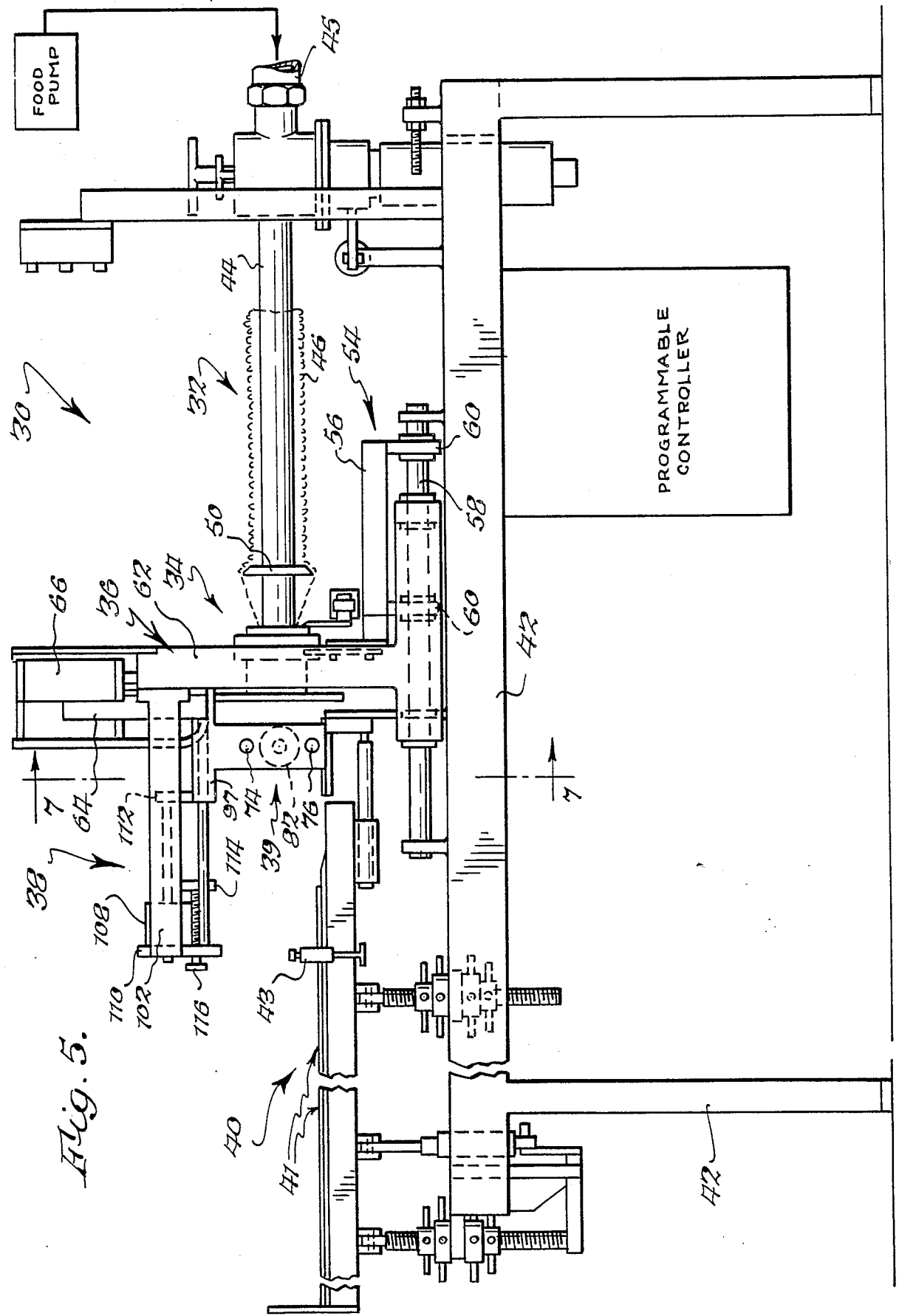
FIG. 5 is a side elevational view of a representative food stuffing apparatus for preparing dimensionally uniform products with certain parts removed for purposes of clarity, and includes the slacker device for preparing partially filled food casings.

Slack filled food casings like those of FIG. 1 may be prepared with stuffing apparatus 30 (FIG. 5) consisting of principal sections: for food delivery 32, product sizing 34, product closing 36, casing slacker 38, and product receiver and discharger 40. All such sections may be mounted integrally into an apparatus on table support 42.

Food delivery section 32 is intended for transporting a pressurized foodstuff, e.g. meat emulsion, cheese product, etc., to casing 46 mounted on filling horn 44. This is achieved with a food pump of conventional design which is interconnected to filling horn 44 at inlet end 45 for effectuating delivery of the pressurized foodstuff to horn outlet 48 (FIG. 7) and into casing 46. Typically, the casing employed is in the form of a pleated strand or precut length of unshirred fibrous or nonfibrous reinforced tubular material. Filling horn 44 may also be equipped with a horn or presizing ring 50 on the horn shaft for purposes of aiding in deshirring and diametrically stretching the casing before filling, and for more optimal circumferential size control during the stuffing cycle.

Filling apparatus 30 may include a sizing section 34 for controlling product diameter and uniformity. Suitable representative sizing devices include inter-alia those disclosed in U.S. Pat. Nos. 4,709,450 and 4,773,128. Other known sizing devices comprising brake assemblies for engaging unfilled casing on the filling horn and which effectively control the rate of release of casing during filling for a high degree of product uniformity may also be employed. However, the casing brake assemblies disclosed in detail in U.S. Pat. Nos. 4,709,450 and 4,773,128, are generally preferred. Such devices are supported by a motor driven (not shown), axially translatable carriage assembly 54 which includes a platform 56 slidably mounted on spaced parallel rails 58 affixed to table 42 which pass through rail openings in platform legs 60. Carriage assembly 54 also includes parallel vertical supports 62 for supporting the components of casing closing section 36 and casing slacker section 38. Accordingly, the carriage assembly advantageously provides both supporting means and means for simultaneous axial translation of casing sizing, product closing and slacking sections.

Product closing section 36 may include adjacent clipper mechanisms 64 and 66 (FIGS. 5 and 7) mounted to carriage assembly 54 through vertical supports 62 for translation along the axis of the filling horn. Such clipper devices are available from Tipper Tie, Inc., Apex, N.C. The first clipper 64 is a chub clipper which compresses the trailing end of a filled casing, gathers the casing of the compressed end of the filled product and applies an end-closure clip thereto. The second clipper 66 adjacent to the filling horn outlet 48 is the horn clipper which gathers the attached leading end of unfilled casing, applies an end-closure clip to prepare the next adjacent unfilled casing on the filling horn for stuffing. A mechanical knife 68 of conventional design positioned between the clippers is actuated to sever the casing between the chub and horn clips.

Figure 7:
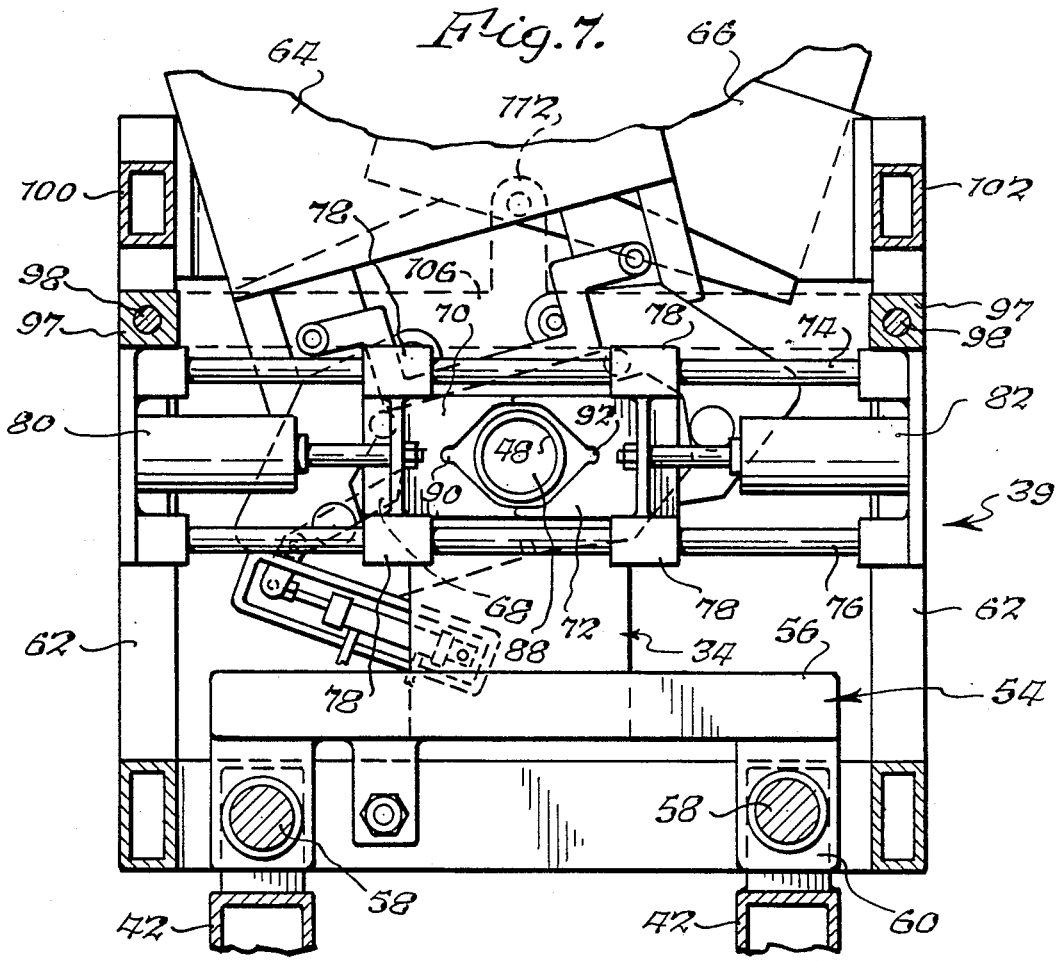
FIG. 7 is a end sectional view taken along line 7—7 of the stuffing apparatus of FIG. 5.
Figure 8:
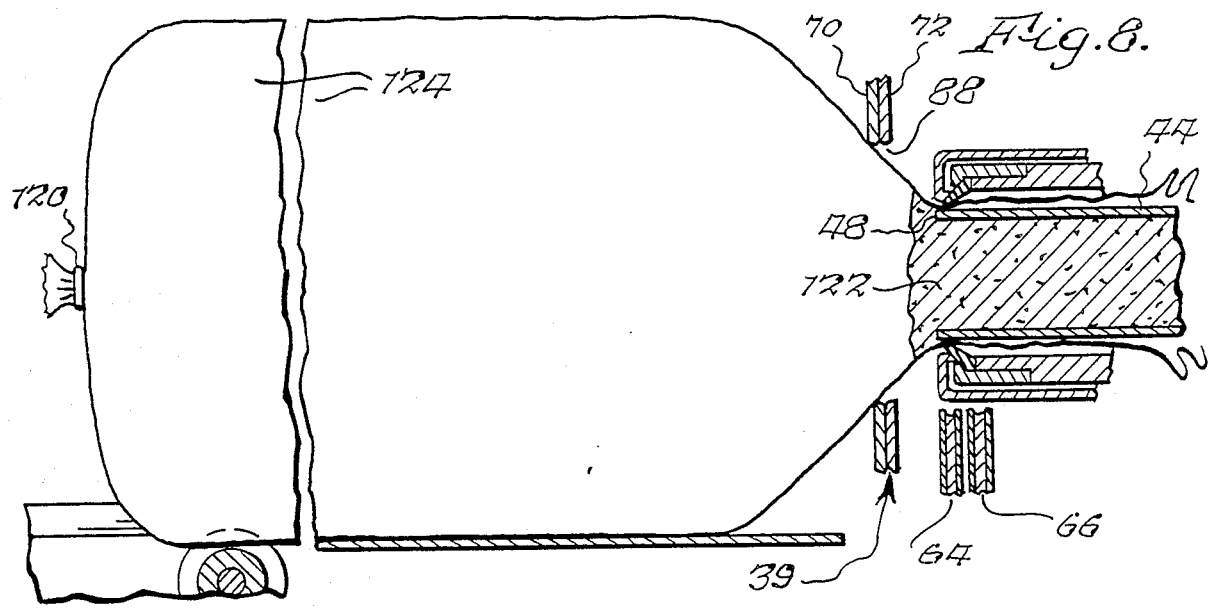
FIGS. 8 to 11 are elevated, side sectional views illustrating representative steps for preparing slack filled casings with portions shown in section.

However, before the casing closing section 36 is actuated to close the filled casing by applying a chub clip thereto, slacker section 38 is activated. The slacker device comprises co-acting shutter/gates 70 and 72 slidably mounted on upper and lower shafts 74 and 76 through sleeve members 78 affixed to each gate. Each gate is driven by fluid motor means 80 and 82, opening and closing the gates in a direction transversally to the axis of the filling horn. Substantially V-shaped grooves 84 and 86 on the inside edges of gates 70 and 72 have their open ends facing generally in a direction towards one another, but offset in adjacent planes to allow overlapping of the grooves when the gates are in a closed position. FIGS. 7 and 8 depict gates 70 and 72 in an open/retracted position allowing food emulsion to enter unfilled casing on the filling horn and pass unobstructedly through gate opening 88. However, when motors 80 and 82 are actuated the gates are extended compressing the partially filled casing and foodstuff therein. This action gathers and locks casing in notches 90 and 92 of shutters 70 and 72. The locking effect of the shutters permits additional unfilled casing to be pulled from the filling horn for preparing slack filled products.

Figure 6:
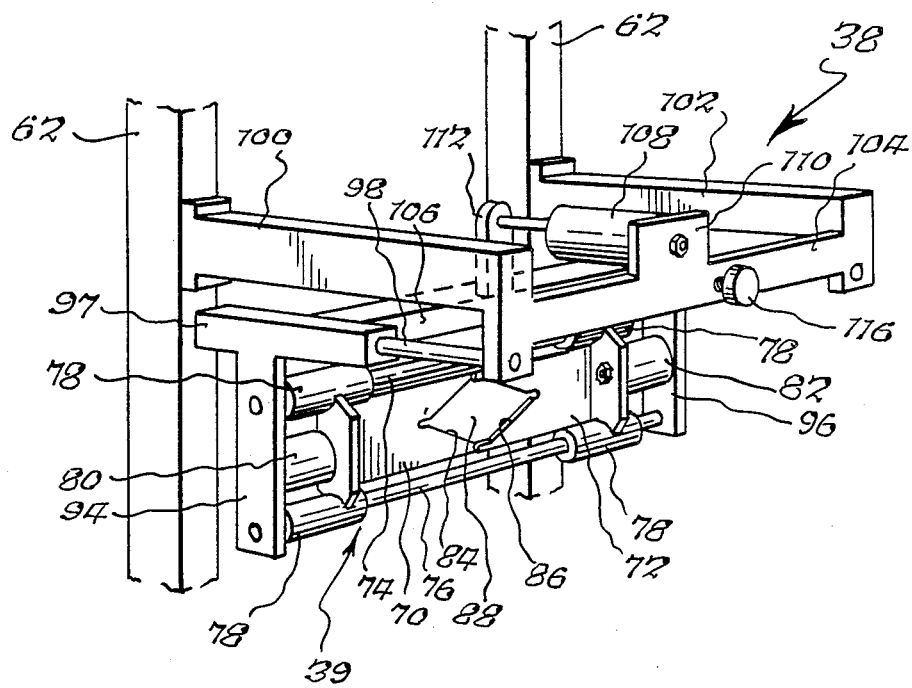
FIG. 6 is a perspective view of the casing slacker of the invention mounted on the filling apparatus of FIG. 5.

Shutter assembly 39 includes axially slidable mounting arms 94 and 96 (FIG. 6) which may have a generally T-shaped configuration. Head 97 of each arm is in the form of a sleeve for slidable axial translation of the shutter assembly on shafts 98. The entire assembly is mounted to parallel vertical supports 62 through horizontal support bars 100 and 102. For axial translation of shutter assembly 39 downstream and upstream from horn outlet 48 (FIG. 7), fluid motor means 108 (FIG. 6), affixed to elevation 110 of cross bar 104 and elevation 112 of cross bar 106, is actuated. The distance assembly 39 travels upon actuation of motor 108 may be regulated by means of stop 114 by turning threaded screw 116.

Product receiver and discharge section 40 may typically include a motorized dump table 41 for discharging a partially filled and closed product from the filling apparatus. Table 41 may have additional useful features, like a product length limiting switch 43 which when activated shuts off the meat pump when the leading end of a filled casing engages the switch which can be set to any length along table 41.

The methods of preparing slack filled casings may be illustrated by reference to FIGS. 8 to 11. FIG. 8 depicts the initial stage of the process in which a first portion 124 of shirred or other unfilled casing 118 on filling horn 44 is filled with a food emulsion 122. Before filling is commenced a horn clip 120 is applied to the casing by actuating clipper 66. Casing slacker 39 is in a retracted position by extension of the rod of fluid motor 108 (FIGS. 5 and 6), placing the slacker in close proximity to horn outlet 48 with its gates in a fully opened position. This permits the casing to expand freely downstream and readily pass through opening 88 of the slacker mechanism, as foodstuff enters the casing.

Figure 9:
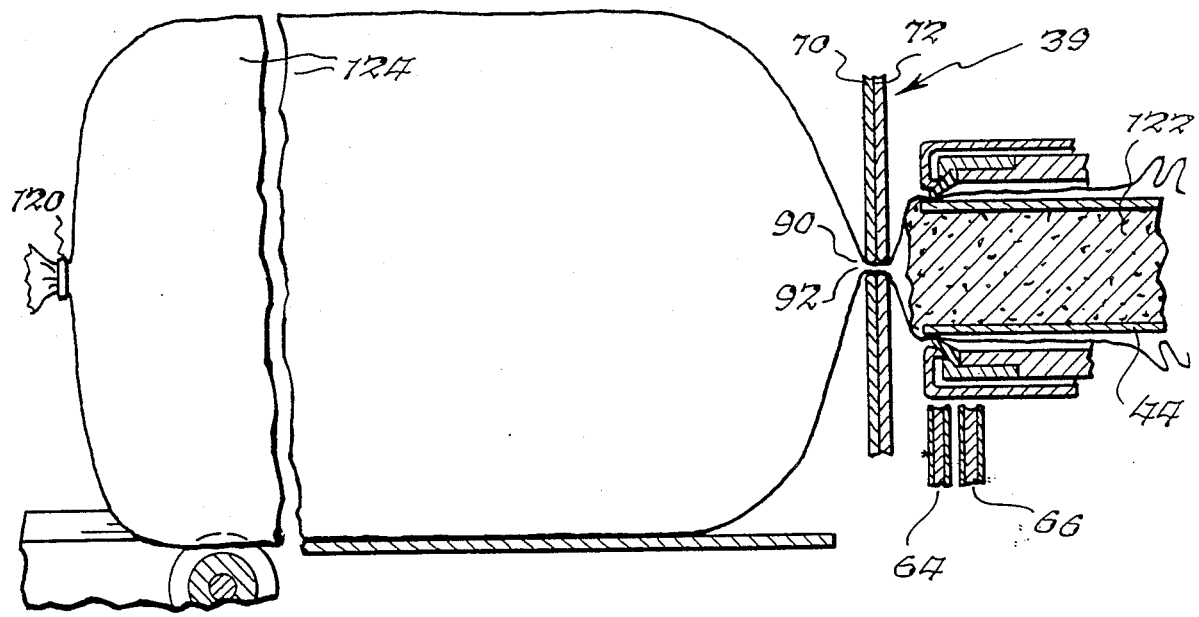
Figure 10:
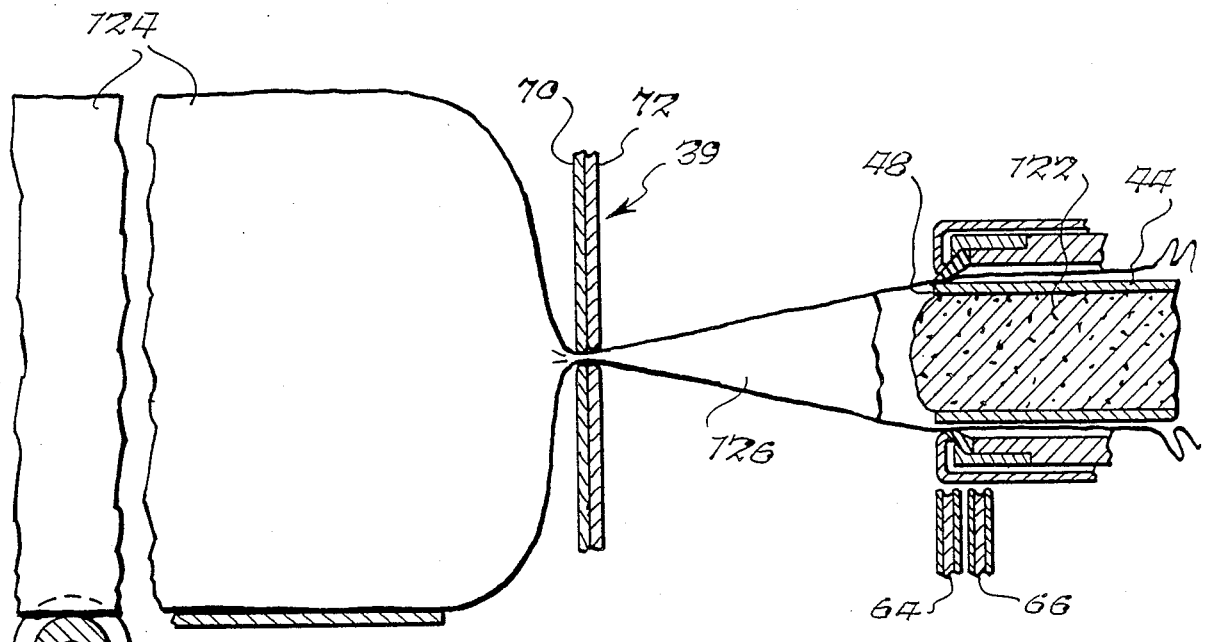

In FIG. 9, filling first portion 124 of the casing with the desired final volume of foodstuff is completed and the food pump turned off. The first portion is generally a tight fill which does not exceed casing manufacturer recommended filled diameter. The gates of slacker 39 are then actuated for purposes of gathering, compressing, closing and gripping the trailing end of the filled first portion 124 of the required final length of casing. The clipper gates 64 and 66 at this point may remain in the same stationary position as in the initial filling step.

With the gates of the slacker mechanism in a firmly closed position motor 108 (FIG. 6) is actuated moving slacker 39 downstream (FIG. 10) away from filling horn 44 withdrawing a preset length or second portion of unfilled casing 126 from the filling horn. Because the filled first portion of casing is neither compressed in the process of withdrawing additional unfilled casing from the horn, nor has an end-closure clip applied to the trailing end of the filled first portion the risk of rupturing the casing in this third step is minimal.

Figure 11:
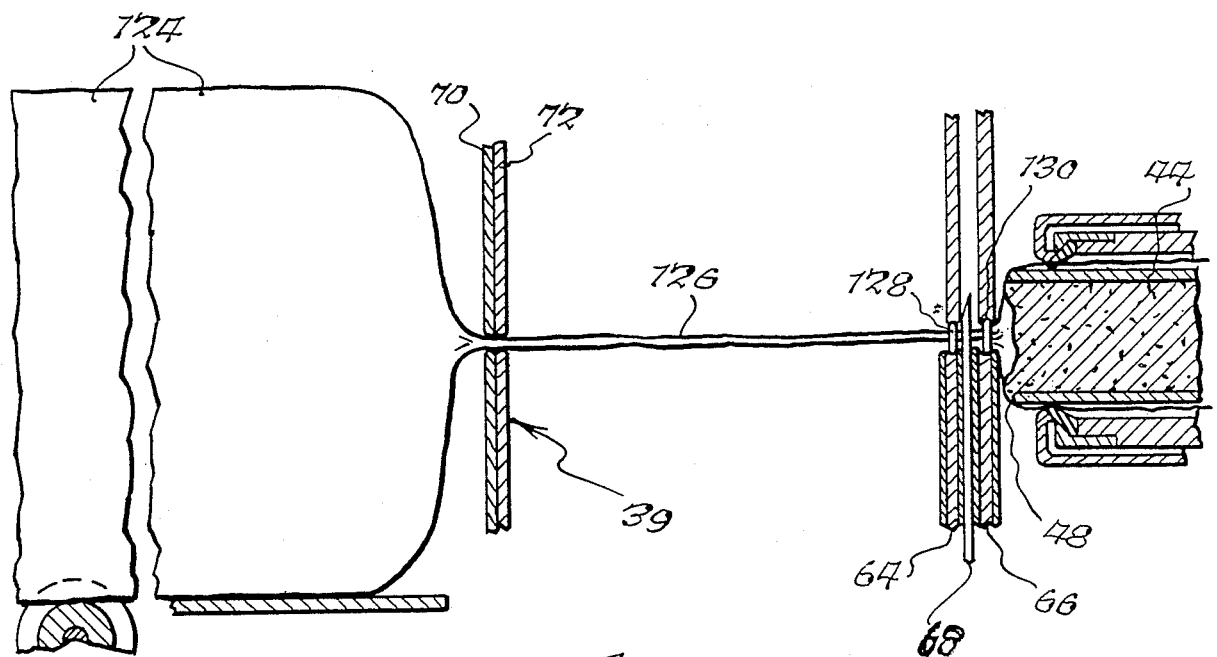

FIG. 11 depicts the step of affixing a chub clip 128 to the trailing end of the second portion of unfilled casing 126 withdrawn from the filling horn, and also the step of applying a spaced horn clip 130 to the next adjacent unfilled casing. In advancing clippers 64 and 66 away from horn outlet 48 motor driven carriage assembly 54 (FIG. 5) which supports both the clipper and slacker mechanisms is advanced downstream of the filling horn placing clippers 64 and 66 in front of the horn outlet. By advancing the carriage assembly the gates of clippers 64 and 66 are free to gather and compress the casing for application of clips 128 and 130 which are spaced from one another, and to permit cutter means 68 to sever the casing. The filling apparatus then goes into the dump cycle where the partially filled product is discharged, and a new filling cycle commences.

The partially filled product coming off the filling apparatus having an unfilled portion of casing 126 can then be molded or smoothed out manually by the operator, who works the partially filled casing by distributing the foodstuff evenly throughout the first and second portions of the casing.

Although the invention has been described in considerable detail with respect to the preferred embodiments thereof, it will be apparent that the invention is capable of numerous modifications and variations to those skilled in the art without departing from the spirit and scope of the invention as defined in the appended claims.

We claim:

1. A method for partially filling a food casing, which comprises the steps of:
 a) loading a stuffing horn at a filling station with a food casing having a leading first end and a trailing second end, said first end having an end-closure;
 b) withdrawing a first portion of a required final length of casing from said stuffing horn by filling a leading first interior region in said first portion with a foodstuff;
 c) withdrawing a second portion of the required final length of casing from said stuffing horn to provide a trailing second interior region substantially free of foodstuff, said trailing second interior region being a continuation of the leading first interior region;
 d) closing the second end of said casing, and e) distributing the contents of said closed casing between said first and second interior regions.

2. The method of claim 1 including the step of filling said leading first region substantially to capacity.

3. The method of claim 1 including the step of engaging an end of said filled first region, and axially pulling the second portion of casing from the filling horn.

4. The method of claim 2 including the step of transversally engaging the trailing end of said first portion adjacent to said stuffing horn and axially pulling additional casing from said stuffing horn to provide the second portion of casing substantially free of foodstuff.

5. The method of claim 3 including the step of molding the slack-filled casing into a substantially rectangular shape.

6. The method of claim 3 including the step of molding the slack-filled casing into a loaf-shaped configuration.

7. The method of claim 3 including the step of molding the slack-filled casing into a substantially D-shaped configuration.

8. An apparatus for partially filling a food casing, which comprises pump means for pressurizing a foodstuff, a stuffing horn with an inlet for receiving the pressurized foodstuff, and an outlet downstream from said inlet for delivering the foodstuff to a casing mounted on said stuffing horn, means for closing terminal ends of the casing, and means for clamping-off the casing between said terminal ends to maintain substantially all the foodstuff in a first interior region of a required final length of the casing and for axially pulling additional casing from the stuffing horn to provide a second interior region within said required final length of casing which is substantially free of foodstuff and for releasing said casing to provide a continuous, undivided casing interior having foodstuff concentrated substantially in one section thereof.

9. The apparatus of claim 8 including means for molding the partially filled casing into a rectangular shape.

10. The apparatus of claim 8 including means for molding the partially filled casing into a loaf-shaped configuration.

11. The apparatus of claim 8 including means for molding the partially filled casing into a substantially D-shaped configuration.

12. The apparatus of claim 8 wherein the means for closing the terminal ends of the casing comprises first and second spaced clipper devices with gate means for gathering casing, means for affixing spaced clips on a trailing end of a filled casing and a leading end of the next adjacent unfilled casing, and means for severing the casing between said spaced clips.

13. The apparatus of claim 12 including carriage means for axially conveying said first and second clipper devices.

14. The apparatus of claim 13 wherein the carriage means for said first and second clipper devices provides support means for said means for clamping-off the casing.

15. The apparatus of claim 14 wherein the means for clamping-off the casing comprises co-acting shutters for transversally engaging the casing and motor means for axially conveying said shutters relative to the stuffing horn.

16. The apparatus of claim 8 wherein the means for clamping-off the casing comprises co-acting shutters for transversally engaging the casing and motor means for axially conveying said shutters relative to the means for closing the terminal ends of said casing and said stuffing horn.

17. The apparatus of claim 16 including carriage means for axially conveying said means for closing the terminal ends of said casing and means for clamping-off said casing.

18. The apparatus of claim 8 including sizing means for regulating the diameter of the casing during filling.

19. The apparatus of claim 18 including means for presizing the casing before filling.

* * * * *